United States Patent [19]
Kveglis et al.

[11] Patent Number: 5,877,259
[45] Date of Patent: Mar. 2, 1999

[54] HEAT SEALABLE ADHESIVE COATING COMPOSITION AND PROCESS

[75] Inventors: Albert A. Kveglis, Pine Brook; Robert J. Catena, Belleville; Joseph M. Laquidara, Westwood, all of N.J.; Stavros Staveris, Strasbourg, France

[73] Assignee: Sun Chemical Corporation, Fort Lee, N.J.

[21] Appl. No.: 950,118

[22] Filed: Oct. 14, 1997

[51] Int. Cl.[6] ............................. C08L 53/00; C08K 5/09
[52] U.S. Cl. ............................. 525/88; 524/81; 524/113; 524/220; 524/284; 524/356; 524/366; 524/717; 524/755; 524/770; 525/63; 525/64; 525/89; 525/95; 525/191; 525/240; 525/242; 526/72; 526/340; 156/327
[58] Field of Search ............................. 524/81, 113, 220, 524/284, 356, 366, 717, 755, 770; 525/63, 64, 88, 89, 95, 191, 240, 242; 526/72, 340; 156/327

[56] References Cited

U.S. PATENT DOCUMENTS

| | | | |
|---|---|---|---|
| 3,862,077 | 1/1975 | Schulz et al. | 524/417 |
| 3,862,098 | 1/1975 | Milkovich et al. | 525/292 |
| 3,879,492 | 4/1975 | Milkovich et al. | 523/100 |
| 3,981,958 | 9/1976 | Nakashima et al. | 525/265 |
| 3,989,768 | 11/1976 | Milkovich et al. | 525/130 |
| 4,007,311 | 2/1977 | Harlan, Jr. | 428/246 |
| 4,098,980 | 7/1978 | Markle et al. | 526/201 |
| 4,753,708 | 6/1988 | Markert et al | 156/327 |
| 5,244,995 | 9/1993 | Skillicorn et al. | 526/340 |
| 5,399,620 | 3/1995 | Niessner et al. | 525/71 |

*Primary Examiner*—Samuel A. Acquah
*Attorney, Agent, or Firm*—Sidney Persley

[57] ABSTRACT

A heat-sealable adhesive for dissimilar substrates is disclosed comprising an organic solvent suspension of a graft copolymer of an A-B-A terblock copolymeric rubber, olefin copolymer and olefin terpolymer. Processing conditions are improved over known adhesive preparation conditions.

18 Claims, No Drawings

HEAT SEALABLE ADHESIVE COATING COMPOSITION AND PROCESS

FIELD OF THE INVENTION

This invention relates to a novel solvent-based heat sealing adhesive coating composition and to the process for preparing the adhesive composition. The invention particularly relates to a graft copolymer film-forming composition for adhesively bonding dissimilar materials to produce a composite product having high adhesive bond strength. Production of the novel composition can be carried out by methods greatly improved over adhesive production methods known in the art.

BACKGROUND OF THE INVENTION

Multilayered composites are among the most ubiquitous and ancient of synthetic structural materials in society that combine the properties of dissimilar substances to produce a single product with chemical and/or physical capabilities not otherwise readily obtainable. Certainly among the oldest method of preparing a structural composite is to bond layers of dissimilar substances together using an adhesive. Plastic films and fiber, however, may be coextruded or heat laminated to form a multilayered composite and electrodeposition of polymers can be used to coat metal film. But overall, adhesive bonding prevails as the means to prepare composites from dissimilar substances, particularly composites of plastic and metal film.

Physical chemical experts in plastic/metal film adhesion hold that if a perfect union of plastic and metal substrates were obtained, i.e., one where the two surfaces mate completely within van der Waal's radii, the strength of the adhesive bond would be the algebraic sum of the substrate bond strengths and, therefore, the adhesive bond strength would exceed that of the lower (plastic) substrate tensile strength. The impediments to achieving this plausible ideal are the ability of the plastic material, or precursor, to wet the metal surface and the rheological properties of the plastic that may inhibit its flow into and full contact with the craters and valleys comprising the metal surface–and do all this while providing a composite plastic substrate having good tensile strength. Now, if the mundane but overriding considerations of production cost and composition cost are added to the equation, the complete challenge to researchers in the science of adhesion chemistry seeking to improve the art of metal/plastic adhesion is defined.

Of course, there are many adhesives known in the art for metal/plastic adhesion, especially aluminum/plastic adhesion. Their large number is indicative of the vagaries of the applications in which the adhesive compositions and composites are used, requiring different plastic or metal properties and, in turn, different adhesive properties and compositions. Compositions may be applied as solutions or dispersions of oligomers, simple polymers, copolymers or graft copolymers and heat sealed to form the adhesive bond. For aluminum-plastic adhesion, polyolefins are often used, despite the fact that adhesion to polyolefin surfaces is often difficult to achieve. But polyolefins are inexpensive and, therefore, extensive development has been conducted to formulate effective adhesives for dissimilar substrates, at least one of which is a polyolefin.

U.S. Pat. No. 4,753,708 discloses a film forming dispersion for heat sealing of dissimilar substrates such as polyolefins and aluminum wherein the dispersion comprises at least two different types of polymers, particularly olefin polymers or random copolymers and acrylic resins, in an organic solvent system. The two polymer types are essentially incompatible and have different adhesive affinities for the substrates. The two polymers have an acid number ranging from 0 to 160 mg KOH per gram of polymer. The dispersion further contains a graft polymer containing components corresponding to the two different polymer types. As a rule, the graft copolymer is prepared by making a dispersion of the olefin polymer/copolymer, with the aid of an appropriate emulsifier, and grafting acrylic monomers onto it.

The method for preparing the adhesive dispersion of the foregoing '708 patent comprises a three step process which requires about forty hours to complete. A substantial portion of the lengthy preparation process is dictated by the need to form the dispersion of an ethylene/propylene copolymer in organic solvent in contact with emulsifier. The dispersion step requires long agitation of the mixture under shearing conditions and a long period of heating in organic solvent in order to swell the olefin polymer or random copolymer particles and allow grafting or reacting the polymer with acrylates.

The object of the present invention is to provide an improved adhesive composition for bonding dissimilar substrates at a high peel strength. The preferred substrates are aluminum and polyolefin film.

A particular objective of the invention is to provide the foregoing improved adhesive composition prepared by a method simpler and substantially faster than methods employed in the relevant art heretofore.

SUMMARY OF THE INVENTION

An adhesive composition for joining dissimilar substrates has been discovered that exhibits excellent peel strength, particularly for bonding aluminum film or sheet to polyolefin film or sheet. Advantageously, the composition can be prepared relatively simply and quickly by employing a process that uses a preferred combination of organic solvents which readily dissolve or solvate the polymeric and monomeric adhesive precursors, enhancing their reactivity and the formation of the adhesive composition.

The adhesive composition of the invention comprises an organic solvent suspension of a graft copolymer containing segments that include an A—B—A block terpolymer segment, a polyacrylate copolymer segment and a polyolefin copolymer segment. The suspension composition may also contain one or more of ungrafted individual polymers of polyolefin, polyacrylate and A—B—A block terpolymer as well as the graft copolymer. As such, the adhesive suspension is considered to be a mixture of related polymeric species dissolved in true and colloidal solution wherein the species, individually or in graft copolymer configuration, have disparate affinities for the dissimilar substrate surfaces.

In the A—B—A terblock copolymer segment of the composition, the A block is typically a vinyl homopolymeric segment such as polystyrene, polyvinyl chloride or polyvinyl acetate; the B block segment is typically an olefin copolymer segment such as copolymeric segments derived from ethylene, propylene and/or butylene.

The polyacrylate copolymer segment of the composition is typically a copolymer of alkyl methacrylates such as methyl methacrylate and butyl methacrylate.

The polyolefin copolymer segment of the composition is typically a copolymer of at least two of ethylene, propylene, butylene and ethylidene-norbornene.

More particularly, the invention comprises an adhesive composition for dissimilar substrates comprising an organic solvent system containing a graft copolymer having a segment containing a linear A—B—A terblock copolymer wherein A is a block of vinyl polymer and B is a block of olefin copolymer. The graft copolymer contains another segment containing a random olefin copolymer wherein both segments further containing graft segments comprising polyacrylate(s).

Preferably, the process of the invention is carried out by dissolving the A—B—A block terpolymer and polyolefin precursors of the graft copolymer in a hydrocarbon solvent such as octane at elevated temperature. A ketone solvent such as methyl ethyl ketone is added to the solution followed by polyacrylate copolymer precursors such as methyl methacrylate and butyl methacrylate. A free radical initiator such as an organic peroxide is added to the reaction mixture at elevated temperature to initiate the acrylate copolymerization and graft copolymerization to the A—B—A terblock copolymer and the polyolefin copolymer. Upon completion of the graft polymerization, the hydrocarbon and ketone solvents are removed by distillation and replaced with an alkyl acetate such as butyl acetate in an amount sufficient to provide the adhesive suspension of the invention.

DETAILED DESCRIPTION OF THE INVENTION

1. Coating Composition

Preferably and by way of illustration, the graft copolymer that comprises an essential part of the adhesive suspension of the invention is considered to have an empirical structure represented by

Q is the polymeric moiety grafted unto X and Y. The structure expands according to the number of sites greater than one where grafting initiates on X and Y. Q is a copolymeric segment of the graft copolymer and comprises polyacrylate copolymers such as those prepared from butyl methacrylate and methyl methacrylate.

The polyacrylate copolymer segment Q has the structure:

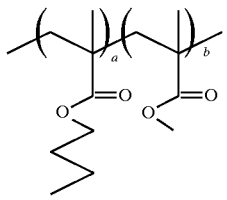

wherein a and b are integers between 1 and 500.

X is an A—B—A terblock copolymer segment such as polystyrene-polyolefin copolymer-polystyrene terblock copolymer having the following structure wherein A is polystyrene, B is ethylene-butylene copolymer

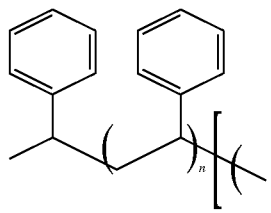

-continued

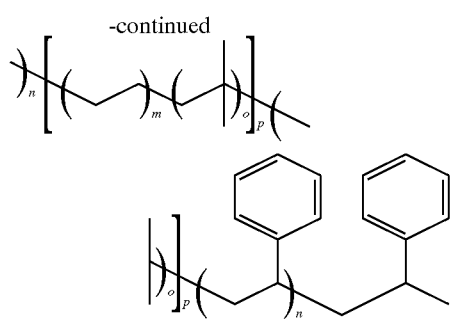

and n, m and o and p are integers between 1 and 500.

Y is a segment comprising a random olefin copolymer such as ethylene, propylene and ethylidene-norbornene copolymer having the following structure wherein x, y and z are integers between 1 and 500:

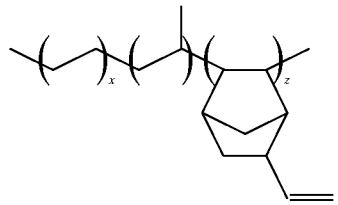

In addition to the graft copolymer, the adhesive suspension composition of the invention may also contain polymers representative of the X, Q and Y segments of the graft copolymer, including polyacrylates, terblock copolymers and olefin copolymers. The graft copolymer and other polymers of the adhesive are in solution and/or suspension in one or more organic solvents.

The polyacrylate polymers and copolymers useful as the Q segment in the graft copolymer composition of the present invention or present in the composition as non-grafted homopolymer or copolymer include polyacrylate homopolymers or copolymers prepared from acrylic acid and/or methacrylic acid, their alkyl and aryl esters and amides. Preferred esters include methyl, ethyl, propyl and butyl acrylate or methacrylate. Preferred amides include unsubstituted acrylamide and methacrylamide although N substituted amides can be used, particularly where the N substituent is one or more alkyl group such as methyl or dimethyl.

The polyolefin polymers and copolymers useful as the Y segment in the graft copolymer composition of the present invention or present in the composition as non-grafted homopolymer or copolymer include all those preparable from lower molecular weight alkenes and cycloalkenes, particularly $C_2$–$C_{12}$ alkenes and $C_3$–$C_{20}$ cycloalkenes. Preferred alkenes and cycloalkenes include ethylene, propylene, butylene and ethylidene-norbornene. A particularly preferred polyolefin copolymer is Buna 437 available from Bayer A. G. which is a random copolymer of ethylene, propylene and ethylidene-norbornene.

The terblock copolymer segment of the graft copolymer is a linear A—B—A type block copolymer comprising essentially identical vinyl homopolymer endblocks (A) connected by an elastomeric saturated polyolefin copolymer midblock (B). The combination of hard endblocks with elastic midblock confers rubber properties on the material. The preferred linear block copolymer contains endblocks of polystyrene and a midblock of saturated ethylene/butylene copolymer in a weight ratio of 29:71. The terblock copolymer is available from Shell as Kraton G-1650. It is soluble in a variety of common solvents.

The polymers, copolymers and graft copolymers that comprise the adhesive resin of the invention are prepared as a suspension dispersed in an organic solvent mixture. Suitable solvents to formulate the adhesive suspension include most organic solvents but particularly ethyl acetate, butyl acetate, methyl ethyl ketone, methyl isobutyl ketone, dimethylformamide, dimethylsulfoxide, mixtures thereof, and the like. The preferred organic solvent is butyl acetate. The preferred solvent forms the adhesive as a suspension wherein differing components are dissolved as true solutions and other, higher molecular weight components are dissolved as colloidal suspensions.

2. Method of Preparation

The method of preparation of the adhesive coating composition of the invention differs substantially from adhesives for dissimilar substrates known in the art. The method of the invention employs a unique combination of solvents which substantially shorten the time required to prepare the product. The method relies upon the discovery that hydrocarbon solvents, especially octane, can be used to dissolve both the polyolefin copolymers used to prepare the Y segment in the graft copolymer and the terblock copolymer used to prepare the X segment in the graft copolymer. When the polyolefin copolymers and the terblock copolymer are dissolved in a common hydrocarbon solvent at elevated temperature, one or more acrylate monomers and graft polymerization initiators are conveniently added to the solution, preferably at elevated temperature, to initiate acrylate polymerization and/or copolymerization whereby polyacrylate branching is formed on the dissolved polyolefin copolymer and the terblock copolymer. At this point another solvent or cosolvent, preferably methyl ethyl ketone (MEK), can be added to the solution to aid in solvating the reactants and the forming graft copolymer, thereby provide a tractable reaction mixture.

The graft copolymerization initiator is a free radical initiator such as one or more organic peroxides, more preferably t-butyl peroctoate. However, free radical initiators are well known in the art and the scope of the invention is not limited to the use of a specific free radical initiator. Preferably, all of the initiator is added to the reaction mixture stepwise over several hours at elevated temperature, although the entire quantity of initiator can be added in one batch while applying a suitable control of the reaction temperature. Optionally, different free radical initiators having different potentials for free radical formation can be added jointly or separately at different stages of the polymerization reaction to control the reaction temperature and the composition of the product formed.

The temperature at which the polyolefin copolymer and the terblock copolymer are dissolved in hydrocarbon solvent is selected primarily to facilitate the rate of dissolution of the reactants. A temperature of 90° to 120° C. is preferred when octane is the solvent. However, with lower or higher boiling hydrocarbon solvents, lower and higher temperatures can be used. Optionally, the process can be carried out at supraatmospheric pressure, thus allowing the use of higher temperatures to dissolve the reactants, but atmospheric pressure is preferred. The polyacrylate polymerization and graft polymer formation reaction can be carried out at temperatures between 20° C. and 200° C. but a temperature between 85°–95° C. is preferred and most preferably a temperature between 88°–92° C.

When the graft copolymerization reaction is complete, usually when the conversion is greater than 90%, the hydrocarbon solvent and any cosolvent such as MEK are removed by distillation and replaced with alkyl acetate solvent. When the reaction mixture contains octane and MEK as solvents, butyl acetate is added to the mixture to remove octane as the octane/butyl acetate azeotrope, preferably under vacuum distillation conditions. The final product of the method preferably comprises the adhesive suspension composition described heretofore dissolved in butyl acetate solvent. However, other solvents or cosolvents well known in the art may be used to dissolve the adhesive composition of the invention and form the novel adhesive suspension. Those skilled in the art will well recognize that it is the graft copolymer composition of the invention that produces the unique adhesive properties disclosed herein and the suspending solvent is a convenient means to apply the adhesive.

A particularly remarkable aspect of the method of the invention is that the selection of terblock copolymer as a component of the process substantially shortens the time required to prepare the adhesive suspension compared to other methods for adhesive production such as that described in U.S. Pat. No. 4,753,708. The process of the invention can be carried out in fourteen hours or less while the process described in the '708 patent requires about 40 hours to complete. Although comprising a substantially shorter process, the process of the invention produces an adhesive coating product that exhibits excellent peel strength for dissimilar substrates, especially aluminum foil and polyolefin film substrates.

In the method of the invention the reactant mixture may contain between 75 and 25 weight percent of the block copolymer and between 25 and 75 weight percent of the polyolefin copolymer.

The following Examples are provided to illustrate the novel coating products of the invention and the process for their preparation.

EXAMPLE 1

Preparation of Adhesive Coating Composition 34.4 g of Kraton G-1650 terblock copolymer, 131.2 g of butyl acetate and 86.4 g of octane were combined in a 1 liter round bottom flask equipped with a reflux condenser, mechanical agitator, thermometer and nitrogen blanket. The contents were heated and stirred at 90° C. until the polymer was dissolved. 23.0 g of Buna 437 (ethylene/propylene/ethylidene-norbornene polymer) were added slowly and the temperature was increased to 118° C. over 15 minutes and held for 1 hour. Then, 92.8 g of MEK was added by addition funnel over five minutes with a lowering of temperature to 90° C. Nitrogen was then switched to sparge and 30 g of butyl methacrylate (BMA) and 30 g of methyl methacrylate (MMA) were added to the flask. At 90°±2° C., 0.25 g of t-butyl peroctoate were added to the flask to begin the reaction. The temperature was held at 90°±2° C. and 0.25 g of t-butyl peroctoate was added to the flask at intervals of 1.5 hours, 3 hours and 4.5 hours from the first addition.

After the fourth addition of t-butyl peroctoate the percent conversion was measured at 87%. One more addition of 0.25 g of t-butyl peroctoate and 2 hours of additional reaction time brought the conversion close to 94%. Next, MEK was vacuum distilled over at 90° C., followed by addition of 185 g of butyl acetate and subsequent vacuum distillation of the octane/butyl acetate azeotrope (86 g/93 g, respectively). When 110 g of the distillate were recovered, vacuum was released and a final adjustment of 84 g of butyl acetate was made. Vacuum distillation was resumed until a solids content of 27% was obtained.

The suspension was cooled to 70° C. and discharged through a filter to give a hazy blue suspension with a viscosity of 25 poise (Brookfield Model RVT #3 sp. @ 25° C.).

EXAMPLE 2

Comparative Properties of Adhesive Coating

The peel strength of the adhesive of Example 1 was tested and compared to the peel strength of a commercial adhesive, Plexisol PM555, as follows: A strip of primed aluminum, 15 mm×100 mm, was coated with each adhesive containing up to 1% ( dry/dry basis) VMCH adhesion promoter (vinyl chloride/vinyl acetate/maleic acid polymer from Union Carbide). The coating weight was calculated to be 6 g/m². A strip of opaque polypropylene (15 mm×80 mm) was heat sealed unto the coated aluminum using a heat-sealer set for conditions of 200° C., 1 sec, and 6 bars. Results:

| Sample | Bond Strength (N/15 mm) |
|---|---|
| Example 1 | 9.6 ± 0.7 |
| Plexisol PM555 | 10.7 ± 0.2 |

What is claimed is:

1. An adhesive composition for dissimilar substrates comprising:

a graft copolymer having the structure

X—Q—Y, wherein Q is a copolymeric segment of the graft copolymer comprising polyacrylate(s) having the following structure (I) wherein a and b are integers between 1 and 500:

(I)

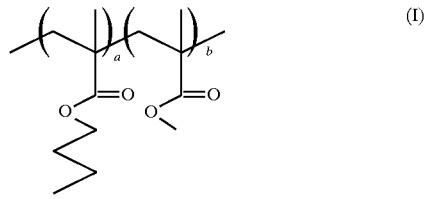

(II)

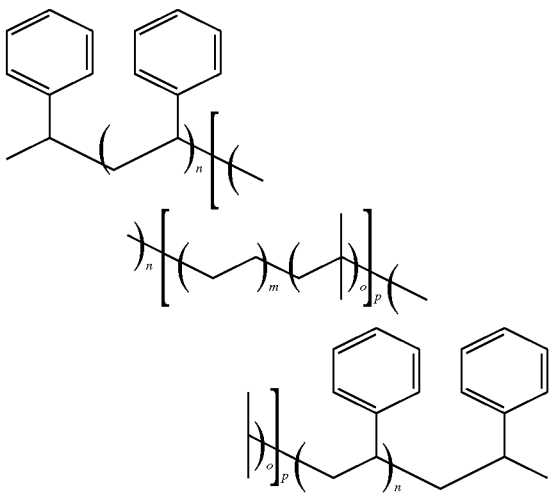

X is an A—B—A terblock copolymer segment having the above structure (II) wherein A is a vinyl polymer, B is olefin copolymer and m, n, o and p are integers between 1 and 500;

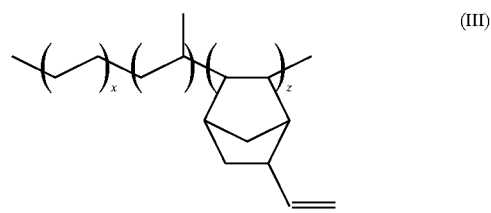

(III)

and Y is a segment comprising a random olefin copolymer having the above structure (III) wherein x, y and z are integers between 1 and 500; wherein said adhesive composition is contained in an organic solvent system.

2. The composition of claim 1 wherein Q is a copolymer of methyl methacrylate and butyl methacrylate.

3. The composition of claim 1 wherein said vinyl polymer of X is polystyrene and said olefin copolymer is ethylene-butylene.

4. The composition of claim 1 wherein said random copolymer of Y comprises a copolymer of ethylene, propylene or ethylidene-norbornene.

5. The composition of claim 1 wherein said organic solvent system includes aliphatic and aromatic hydrocarbons, halogenated aliphatic and aromatic hydrocarbons, alcohols, ketones, ethers, esters, alkyl formamides and sulfoxides.

6. The composition of claim 1 further including polyolefin copolymer and/or polyacrylate copolymer.

7. A method for producing a film-forming organic solvent suspension of graft copolymers for heat sealing of dissimilar substrates, said method comprising:

(a) preparing at elevated temperature a reactant mixture comprising a linear A—B—A terblock copolymer wherein A is a vinyl polymer and B is a polyolefin, plus polyolefin copolymer in an organic solvent system; ternary solvent mixture comprising alkyl acetate, $C_5$–$C_{12}$ aliphatic hydrocarbon or methyl ethyl ketone;

(b) introducing into said reactant mixture alkyl acrylate and/or methacrylate monomer(s) plus at least one peroxide graft polymerization initiator;

(c) maintaining said mixture at said temperature for a time sufficient to complete said graft polymerization and provide said graft copolymers as product;

(d) distilling said solvent mixture from said reactant mixture and dispersing said graft copolymer product as a suspension in at least one organic solvent.

8. The method of claim 7 wherein said elevated temperature comprises temperature between 20° C. and 250° C.

9. The method of claim 8 wherein said temperature is about 90° C.

10. The method of claim 7 wherein step (c) time sufficient is between 4 to 10 hours.

11. The method of claim 7 wherein said product is dispersed in butyl acetate.

12. The method of claim 7 wherein said A—B—A terblock copolymer comprises polystyrene/ethylene-propylene copolymer/polystyrene; said polyolefin copolymer comprises ethylene/propylene/ethylidene-norbornene terpolymer; and said alkyl acrylate or methacrylate monomer comprises butyl methacrylate or methyl methacrylate.

13. The method of claim 7 wherein said reactant mixture contains between 75 and 25 weight percent of said block copolymer and between 25 and 75 weight percent of said polyolefin copolymer.

14. The method of claim 7 wherein said organic solvent system includes aliphatic and aromatic hydrocarbons, halogenated aliphatic and aromatic hydrocarbons, alcohols, ketones, ethers, esters, alkyl formamides and alkyl sulfoxides.

15. The method of claim 14 wherein said organic solvent system comprises butyl acetate, octane and methyl ethyl ketone.

16. An adhesive composition for dissimilar substrates comprising:

an organic solvent system containing a graft copolymer having a segment containing a linear A—B—A terblock copolymer wherein A is a block of vinyl polymer and B is a block of olefin copolymer; and another segment containing a random olefin copolymer, said segments further containing graft segments comprising polyacrylate(s).

17. The composition of claim 16 wherein said A—B—A terblock copolymer comprises polystyrene/ethylene-propylene copolymer/polystyrene; said olefin copolymer comprises ethylene/propylene/ethylidene-norbornene terpolymer; and said polyacrylate(s) comprise butyl methacrylate or methyl methacrylate.

18. The composition of claim 16 wherein said organic solvent system is butyl acetate.

* * * * *